US011602953B2

(12) United States Patent
Drewes

(10) Patent No.: US 11,602,953 B2
(45) Date of Patent: Mar. 14, 2023

(54) HOUSING UNIT AND AXLE ASSEMBLY

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 154 days.

(21) Appl. No.: 16/649,323

(22) PCT Filed: Aug. 13, 2018

(86) PCT No.: PCT/EP2018/071880
§ 371 (c)(1),
(2) Date: Mar. 20, 2020

(87) PCT Pub. No.: WO2019/057397
PCT Pub. Date: Mar. 28, 2019

(65) Prior Publication Data
US 2020/0262239 A1     Aug. 20, 2020

(30) Foreign Application Priority Data

Sep. 22, 2017   (DE) .................... 10 2017 122 017.8

(51) Int. Cl.
*B60K 17/04*     (2006.01)
*B60B 27/04*     (2006.01)
(Continued)

(52) U.S. Cl.
CPC ............ *B60B 27/04* (2013.01); *B60B 35/125* (2013.01); *B60G 9/00* (2013.01); *B60K 17/046* (2013.01); *B60K 17/22* (2013.01); *B60B 27/001* (2013.01)

(58) Field of Classification Search
CPC ..... B60B 27/04; B60B 35/125; B60B 27/001; B60B 27/0052; B60G 9/00; B60K 17/22; B60K 17/046
See application file for complete search history.

(56) References Cited

U.S. PATENT DOCUMENTS 1,377,864 A * 5/1921 Walter ................. B60K 17/046
                                                          475/341
1,464,887 A * 8/1923 Starr .................... B60K 17/046
                                                          475/269
(Continued)

FOREIGN PATENT DOCUMENTS

DE          3507232 A1     9/1986
EP          2851582 A1     3/2015
(Continued)

OTHER PUBLICATIONS

European Patent Office; International Search Report; dated Oct. 17, 2018.

*Primary Examiner* — Frank B Vanaman
(74) *Attorney, Agent, or Firm* — Price Heneveld LLP

(57) ABSTRACT

A housing unit for use in an axle end assembly including first and second housing parts, wherein one of the first and the second housing parts are disposed to be mutually rotatable and define a housing interior space, wherein the first housing part for establishing on a hub has a flange, wherein the second housing part for safeguarding against rotation in relation to a stator of a wheel suspension has an engagement portion, wherein a gear wheel assembly is disposed in the housing interior space to transmit a torque of a driveshaft to the first housing part, wherein one of the first and the second housing parts, when dismantling the housing unit from the wheel suspension, are mutually established that the housing
(Continued)

interior space remains closed such that at least 70% of the outwardly protruding faces of the housing unit are closed in a fluid-tight manner.

19 Claims, 2 Drawing Sheets

(51) Int. Cl.
  *B60B 35/12* (2006.01)
  *B60G 9/00* (2006.01)
  *B60K 17/22* (2006.01)
  *B60B 27/00* (2006.01)

(56) References Cited

U.S. PATENT DOCUMENTS

| | | | |
|---|---|---|---|
| 2,529,330 A | 2/1948 | Double | |
| 2,772,547 A * | 12/1956 | Nolan | B60K 17/22 |
| | | | 464/162 |
| 3,459,070 A * | 8/1969 | Holdeman | B60K 17/046 |
| | | | 475/337 |
| 3,686,978 A | 8/1972 | Knoblach et al. | |
| 3,960,061 A | 6/1976 | Campbell | |
| 4,092,878 A | 6/1978 | Campbell | |
| 4,159,657 A * | 7/1979 | Stilley | B60K 17/046 |
| | | | 180/372 |
| 4,424,879 A * | 1/1984 | Sonzogni | B60K 17/046 |
| | | | 74/391 |
| 4,427,242 A * | 1/1984 | Otto | B60B 27/001 |
| | | | 384/486 |
| 5,757,084 A * | 5/1998 | Wagner | B60B 27/001 |
| | | | 301/105.1 |
| 9,527,536 B1 | 12/2016 | Giesmann et al. | |
| 2010/0187042 A1 | 7/2010 | Murahashi et al. | |
| 2017/0129331 A1 | 5/2017 | Naitou | |

FOREIGN PATENT DOCUMENTS

| | | |
|---|---|---|
| FR | 2529512 A1 | 6/1983 |
| FR | 2760502 A1 | 9/1998 |
| WO | 2018/228800 A1 | 12/2018 |

* cited by examiner

HOUSING UNIT AND AXLE ASSEMBLY

BACKGROUND OF THE INVENTION

The present invention relates to a housing unit and to an axle end assembly having such a housing unit.

The invention herein relates in particular to a housing unit for disposal of a gearbox in the end region of a wheel mounting. Such gearboxes on axle end assemblies are indeed already known from the prior art. However, in the gearboxes known from the prior art it has been demonstrated as problematic that parts of the gearbox have to be exposed when dismantling individual parts of the wheel suspension of the axle end assembly in order to be able to access the axle nut, for example, or the fastening of further add-on systems in the region of the wheel mounting, for example. This opening of the gearbox unit is associated with a comparatively high complexity in terms of assembling, on the one hand. On the other hand, when opening the gearbox there is always the risk that lubricant escapes and foreign matter makes its way into the gearbox. On account thereof, the operational reliability of the gearbox is at risk, and the complexity in terms of assembling is again increased since particular safeguard measures and clean environmental conditions have to be present in order to access regions of the axle end assembly that lie behind the gearbox, when viewed from the outside.

It is an object of the present invention to provide a housing unit for accommodating a gearbox which can be dismantled from an axle end assembly without the inner workings of the housing unit having to be opened. It is moreover an object of the present invention to provide a particularly compact axle end assembly.

SUMMARY OF THE INVENTION

According to the invention, the housing unit comprises a first housing part and a second housing part, wherein the first and the second housing part are disposed so as to be mutually rotatable and define a housing interior space, wherein the first housing part for establishing on a hub has a flange, wherein the second housing part for safeguarding against rotation in relation to a stator of a wheel suspension has an engagement portion, wherein a gear wheel assembly is disposed in the housing interior space so as to transmit a torque of a driveshaft to the first housing part, wherein the first and the second housing part are mutually established in such a manner that the housing interior space remains substantially closed when dismantling the housing unit from the wheel suspension. The components of the housing are two housing parts which enclose a housing interior space which is substantially closed toward the outside, also in the state in which the housing unit is dismantled from the axle end assembly. A gear wheel assembly is provided in the housing interior space herein, said gear wheel assembly in other words forming a gearbox. The first housing part herein is established, or able to be established, on the hub of an axle end assembly in such a manner that a rotation energy which is transmitted from the gear wheel assembly to the first housing part is simultaneously transmitted also to the hub of the axle end assembly. The rotation energy in turn is transmitted to the gear wheel assembly by a driveshaft which is preferably mounted so as to be rotatable within a stator of the wheel suspension. The stator is preferably an axle end of a hollow rigid axle of a commercial vehicle, or an axle stub of a driven vehicle axle. The stator herein forms the non-rotating part of the axle end assembly and particularly preferably has a bearing seat for the rotatable mounting of the hub on the stator. It is a substantial feature of the present invention that the first and the second housing part are mutually established in such a manner that a mutually relative rotation of the two housing parts about an axial is indeed possible, but a repositioning of the first housing part relative to the second housing part in a manner parallel to the axial is prevented. This feature ensures that the housing unit in its entirety can be pulled off from the axle end assembly after the fastening of the first housing part on the wheel hub has been released, wherein the housing interior space preferably remains substantially closed. Substantially closed in this context means that the predominant part, advantageously at least 70%, preferably at least 80%, and most particularly preferably at least 90%, of the outwardly protruding faces of the housing unit are closed, in particular closed in a fluid-tight manner wherein in a first preferred embodiment only one opening through which the driveshaft, optionally having a first gear wheel fastened thereto, is able to be guided, is provided. On account of this substantially closed design of the housing interior space it is possible to remove the housing unit from the axle end assembly and to prevent herein that foreign matter makes its way into the housing unit. The service life of the housing unit can be significantly increased in this way.

A clearance through which the driveshaft is able to be guided is advantageously provided in the region of the engagement portion on the second housing part. The housing interior space, in case of a housing unit being dismantled from the wheel suspension, is advantageously open toward the environment exclusively in the region of the engagement portion. The clearance through which the driveshaft, optionally having a gear wheel fastened thereto, can be push-fitted into the housing interior space herein is provided in the region of the engagement portion. It is advantageous for the housing interior space to be closed on all the other faces and to be hermetically sealed, in particular in a fluid-tight manner, in relation to the environment. In this way, the ingress of foreign matter into the housing unit can be prevented, on the one hand, and it is possible to prevent the loss of lubricants from the housing unit, on the other hand.

The clearance in the region of the engagement portion herein advantageously has a minimum internal diameter which is 1.05 to 1.3 times the maximum external diameter of the driveshaft, or the maximum external diameter of a first gear wheel of the gear wheel assembly. In other words, the clearance on the second housing part is preferably only slightly larger than either the driveshaft or a first gear wheel that is able to be push-fitted into the housing interior space conjointly with the driveshaft. The risk of ingress of foreign matter can be minimized in this way. The minimum ratio between the internal diameter of the clearance and the maximum external diameter of the part to be in each case push-fitted into the housing unit of 1.05 herein is preferably adequate so as to allow sufficient play for the smooth running, or the free rotating movement, respectively, of the driveshaft within the clearance even at high temperature differentials and a corresponding expansion of the gear wheel or the driveshaft. The minimum internal diameter herein is preferably considered to be the smallest extent of the clearance transversely to an axial about which the driveshaft rotates. The corresponding extent, or the maximum external diameter, of the driveshaft or of the first gear wheel is measured in a manner parallel to the direction of extent of the minimum internal diameter. The upper limit of the ratio range of 1.3 ensures that the clearance on the second housing part offers particularly simple assembling without the risk of jamming, and moreover allows a certain pivotability of the driveshaft about an orthogonal in relation to the axial. However, the clearance herein is simultaneously to be kept as small as possible so as to allow only a small entry surface for the ingress of foreign matter into the housing interior space in the case of a disassembled housing unit, and so as to thus increase the operational reliability of the housing unit.

In an alternative embodiment, the housing interior space, in the case of the housing unit being dismantled from the wheel suspension, is completely closed, or encapsulated, respectively, in relation to the environment, wherein a shaft element protrudes from the housing interior space and by means of a shaft seal is sealed in relation to the second housing part. Alternatively thereto, a clearance through which the driveshaft or the first gear wheel can be push-fitted is to be kept open on the second housing part, should the housing interior space be preferably completely sealed. To this end, a shaft element which is connected to the first gear wheel, or is configured conjointly with the latter, respectively, and protrudes from the housing interior space is provided. A shaft seal herein is preferably inserted into and established in the previously described clearance on the second housing part, said shaft seal conjointly with the cross-sectional face of the driveshaft completely sealing the housing interior space. The highest operational reliability of the housing unit is achievable by way of this embodiment, since the housing interior space is completely sealed in the assembled and dismantled state of the housing unit.

A transmission portion by way of which the driveshaft for transmitting a torque can be brought to engage in a form-fitting manner is preferably provided on the shaft element herein. It is particularly preferable herein that the transmission portion is configured as a combination of convexities and concavities which extend so as to be parallel to the axial, or along the latter, respectively, wherein the driveshaft has a corresponding arrangement of convexities and concavities which are suitable for transmitting a torque from the driveshaft to the shaft element. The shaft element herein is preferably able to be plug-fitted onto the driveshaft along the axial, so as to in the plug-fitted state form an undercut of the driveshaft which permits a torque about the axial, or the rotation axis of the driveshaft, respectively, to be transmitted to the gear assembly. In other words, the transmission portion is configured as an axial toothing, or spur toothing, respectively.

The establishing of the flange on the hub advantageously secures the housing unit in relation to being repositioned along the axial. The establishing of the flange on the hub herein is particularly preferably the only axial safeguard of the housing unit. On account thereof, the housing unit can be completely removed from the wheel suspension, or the axle end assembly, respectively, from the outside and without having to be dismantled, by releasing the fastening of the flange on the hub. The connection of the second housing part to the stator of the axle end assembly is preferably embodied as a plug connection which along the axial can be produced simply by overcoming a minor frictional resistance and can also be released again. The axial is preferably the rotation axis of a vehicle wheel which is established on the axle end assembly, or of the hub on which the first housing part is able to be established.

The engagement portion of the second housing part is particularly preferably configured as a cylindrical portion having an external toothing, wherein the engagement portion is able to be push-fitted along the axial into the stator so as to come to engage in a rotationally fixed manner with an internal toothing on the stator. In this preferred embodiment, the engagement portion of the second housing part preferably engages in a region of the stator, preferably of the axle tube or of the axle stub, which is in the shape of a hollow body, wherein the anti-rotation safeguard between the engagement portion and the stator is produced by way of a toothing. The toothing, thus the external toothing on the engagement portion as well as the internal toothing on the stator, herein extends preferably by way of a consistent geometry along the axial. In this way, the engagement portion can be push-fitted into the stator by applying manual force. It is an advantage of this embodiment that a bearing assembly for mounting the hub and/or a nut for pretensioning the bearings can be established externally in the region of the overlap with the engagement portion. The required length of the stator in a manner parallel to the axial is reduced in this way, on account of which the mounting of the hub and thus of the vehicle wheel on the stator can particularly preferably be provided so as to be further outward along the axial. In terms of the overall system of the axle end assembly, this means that in the case of a predefined maximum external width of the axle, the bearings can be disposed so as to be as far outward as possible on the axle, and a wide track can thus be achieved. The installation space provided on the axle end assembly can be utilized in a particularly optimal manner in this way.

In an alternative embodiment, the engagement portion is configured as a cylindrical portion having an internal toothing, wherein the engagement portion is able to be push-fitted onto the stator along the axial so as to come to engage in a rotationally fixed manner with an external toothing on the stator. In this preferred embodiment, the engagement portion is preferably embodied as a bore which is provided with an internal toothing. A corresponding external toothing onto which the engagement portion is capable of being push-fitted is provided on the stator. This embodiment is particularly expedient when a stator having a small diameter is to be used. The engagement portion herein does not depend on a correspondingly large clearance on the stator, which permits the engagement portion to engage as well as the driveshaft to be guided through being present. Furthermore, this embodiment is suitable for use also on already existing axle end assemblies, wherein the latter for the engagement with the engagement portion have only to be extended in length in the region of the external toothing and are otherwise suitable for receiving the housing unit without modification.

The first housing part particularly preferably overlaps the second housing part, preferably along the axial, in regions, wherein a sealing element which seals the housing interior space is provided in the region of said overlap, wherein the sealing element secures the first and the second housing part in the mutual axial position thereof. Apart from this task, the sealing element for sealing the housing interior space herein also performs a second task, specifically in that a mutual axial repositioning safeguard of the first housing part and the second housing part is provided by the sealing element. It can be achieved in this way that, when the first housing part is unscrewed from the hub and by the user is correspondingly pulled away from the axle end assembly along the axial, the second housing part is also removed from the engagement thereof with the stator by way of the sealing element. The sealing element to this end is particularly preferably a correspondingly reinforced shaft seal ring.

The sealing element is particularly preferably press-fitted into the first housing part. It is furthermore preferable that the sealing element in the assembled state of the housing unit forms an undercut with the second housing part in such a manner that the sealing element while overcoming a specific resistance is also push-fitted onto the second housing part. The sealing element by way of one or a multiplicity of circlips can furthermore preferably be secured in the axial direction on the first and/or on the second housing part. The respective circlip herein engages in a corresponding groove on the first or on the second housing part.

The gear wheel assembly furthermore preferably has a first gear wheel which is drivable or driven indirectly or directly by the driveshaft, wherein the gear wheel assembly comprises at least a second gear wheel which is established on the second housing part and engages in a first internal toothing on the first housing part. The gear wheel assembly in this embodiment, conjointly with the first and the second housing part of the housing unit, forms an epicyclic gearbox, also referred to as a planetary gearbox. The first gear wheel in this embodiment herein is the sun gear; the second gear wheels, or preferably the multiplicity of second gear wheels, form the planetary gear(s), which is/are established so as to be rotatable on the stationary second housing part, wherein the second housing part functions as the carrier of the epicyclic gearbox. The first housing part has an internal toothing and in this context function as the ring gear of the epicyclic gearbox. This embodiment of the gear wheel assembly is distinguished by the particularly short construction length thereof, wherein mid-range gearing ratios can be achieved.

In an alternative embodiment the gear wheel assembly comprises a first gear wheel which is drivable or driven indirectly or directly by the driveshaft, wherein the gear wheel assembly comprises at least a second gear wheel which engages in a second internal toothing on the second housing part and transmits a torque to a third gear wheel which engages in a first internal toothing on the first housing part. This arrangement of the gear wheel assembly and the housing unit is referred to as a so-called Wolfrom gearbox. The second gear wheel herein does not engage in the internal thread on the first housing part, as described above, but first engages in an internal thread which is configured on the second housing part. The second gear wheel herein is in each case connected in a rotationally fixed manner to a third gear wheel by way of a shaft such that the rotating speed of the second gear wheel is transmitted to a third gear wheel which in turn engages in an internal thread on the first housing part. By varying the tooth count of the second gear wheel relative to the third gear wheel in a corresponding manner, it is possible for gearing ratios of more than 40 to be achieved here by means of the housing unit and the gear wheel assembly. At the same time, a Wolfrom gearbox is configured so as to be particularly compact and has an axial extent which is only slightly larger than the conventional planetary gearbox as described above. It is understood that a carrier configured in a disk-shaped manner, which likewise rotates about the axial, can be provided for securing and mounting the shaft which connects the second gear wheel to the respective third gear wheel.

Furthermore provided according to the invention is an axle end assembly, in particular for use in a commercial vehicle, which has a stator, a driveshaft, a hub, and a housing unit, wherein the housing unit has a first housing part which by way of a flange is established on the hub, wherein the housing unit has a second housing part which is mounted so as to be rotatable in relation to the first housing part and by means of an engagement portion is established in a rotationally fixed manner on the stator, wherein the driveshaft which transmits a torque to a gear wheel assembly that is disposed within the housing unit and drives the first housing part and the hub is disposed within the stator, wherein the housing unit encloses a housing interior space which is substantially closed in relation to the environment. In other words, the axle end assembly is thus a wheel mounting, preferably of a commercial vehicle, on which a previously described housing unit is established. The feature according to which the housing unit encloses a housing interior space which is substantially closed in relation to the environment herein however relates not only to the state established on the axle end assembly but also to the state in which the housing unit is dismantled from the axle end assembly. In terms of the further features of the axle end assembly, reference is made to the features and interactions between the individual functional groups described above.

The engagement portion on the axle end assembly is preferably configured as a cylindrical portion having an external toothing, wherein an internal toothing which runs so as to be parallel to an axial and along the axial is situated at the same level as a bearing seat for the rotatable mounting of the hub on the stator and/or an axle nut is provided. In other words, the axial length on the stator on the internal side can be utilized in an optimal manner for establishing the engagement portion, and on the external side utilized in an optimal manner for rotatably mounting the hub and for establishing an axle nut, on account of which the axial length of the axle end assembly is reduced. A widening of the track in comparison to conventional axle end assemblies having a thread disposed thereon can be achieved in this way.

The flange of the first housing part is furthermore preferably established on the hub by way of a multiplicity of wheel bolts. The wheel bolts are preferably disposed so as to be distributed uniformly across a hub flange of the hub, wherein the flange of the first housing part conjointly with the entire housing unit is first push-fitted onto said wheel bolts, and the wheel of a vehicle can subsequently be push-fitted onto the wheel bolts so as to be finally established by way of the wheel nut. The use of wheel bolts for establishing the hub and a vehicle wheel facilitates the assembling, since the hub and also the vehicle wheel can be push-fitted onto the wheel bolts and are only subsequently screw-fitted in the push-fitted state.

BRIEF DESCRIPTION OF THE DRAWINGS

Further advantages and features of the present invention are derived from the description hereunder with reference to the appended figures. It is understood herein that individual features which are shown in only one of the figures can also be used in embodiments of other figures unless this has not been explicitly excluded, or is precluded by virtue of technical parameters. In the figures

DETAILED DESCRIPTION OF THE PREFERRED EMBODIMENTS

Figure 1:
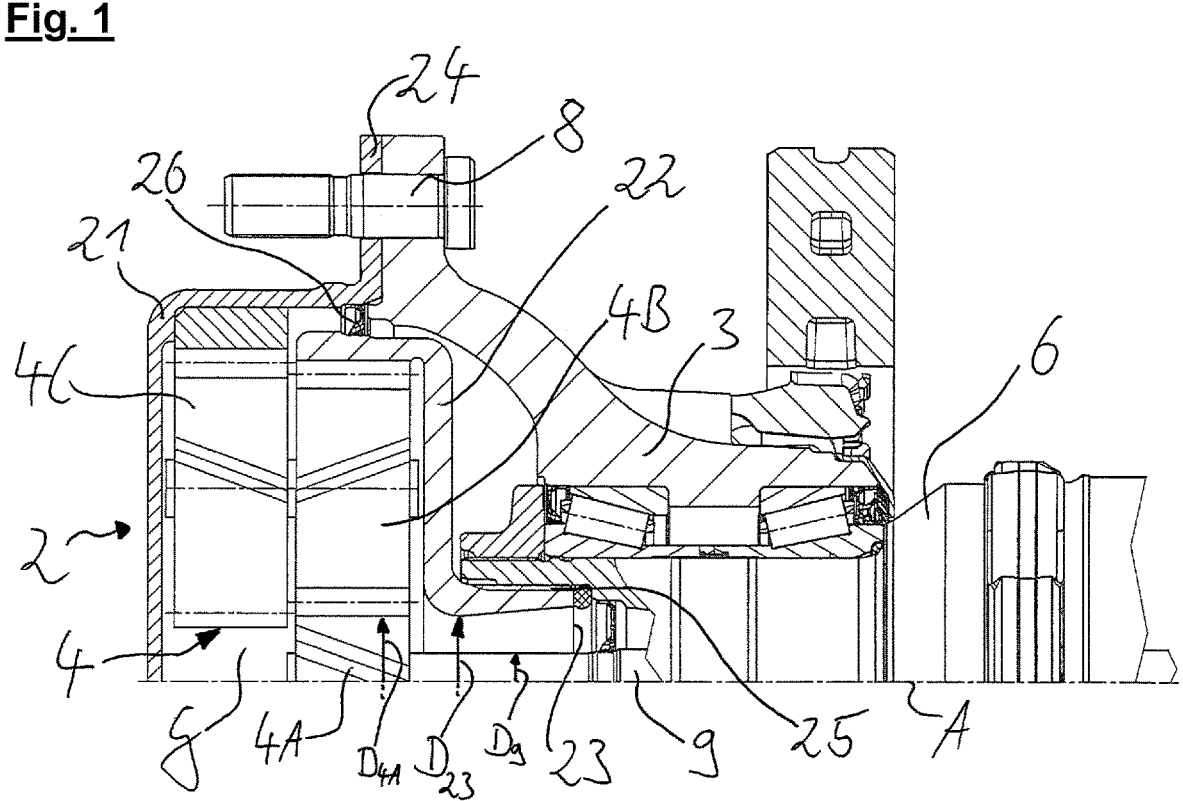
FIG. 1 shows a sectional view of a first preferred embodiment of the axle end assembly according to the invention.

FIG. 1 shows an axle end assembly having a stator 6 which is configured as an axle stump, a hub 3 which is rotatably mounted on the stator 6, and a housing unit 2. The housing unit 2 has a first housing part 21 and a second housing part 22, wherein the first housing part 21 is able to be established on the hub 3 by way of a flange 24. FIG. 1 herein shows the state in which they housing unit 2 is only plug-fitted onto the axle end assembly without a wheel nut for finally establishing the housing unit conjointly with the wheel of a commercial vehicle being already provided. It can be seen in FIG. 1 that the first housing part 21 in the proximity of the flange 24 has a centering seat which allows a wheel to be push-fitted onto the first housing part 21 and to be simultaneously centered herein. The first housing part 21 per se herein by way of the flange 24 is centered on the cylindrically configured centering region of the wheel bolt 8. A sealing element which is preferably configured as a shaft seal ring is provided between the first housing part 21 and the second housing part 22. To this end, the second housing part 22 has a region by way of which said second housing part 22 is plug-fitted into the first housing part 21, or overlaps the latter, respectively. The housing interior space G in which a gear wheel assembly 4 is disposed is formed within the first and the second housing part 21, 22. In the present embodiment, the gear wheel assembly and the first housing part 21 and the second housing part 22 conjointly form a so-called Wolfrom gearbox. A driveshaft 9 herein, which is disposed within the cavity available within the stator 6, is plug-fitted into the first gear wheel 4A and, preferably by way of a toothing, transmits a torque to the first gear wheel 4A. Said gear wheel preferably engages with a multiplicity of second gear wheels 4B, wherein the second gear wheels 4B in turn roll on the second housing part 22 and engage in a second internal toothing $Z_2$ which is provided on said housing part 22. The second gear wheels 4B herein are connected in a rotationally fixed manner to third gear wheels 4C by way of a shaft, wherein the third gear wheels 4C engage with the first internal toothing Z1 which is configured on the first housing part 21. The axial spacing of the second gear wheels 4B from the third gear wheels 4C herein is chosen so as to be particularly short, wherein a disk-shaped or plate-shaped, respectively, holding element which secures the second gear wheels 4B and the third gear wheels 4C against tipping or repositioning inwardly in the direction of the axial A can also be preferably provided here. The second housing part 22 has an engagement portion 25 which has an external toothing and is push-fitted into a cavity on the stator 6. To this end, the stator 6 has an internal toothing which conjointly with the external toothing of the engagement portion 25 forms an anti-rotation safeguard. The advantage of this embodiment is that a wheel nut as well as the bearing assembly for the rotatable mounting of the hub 3 on the stator 6 can simultaneously be disposed so as to be level with the engagement between the stator 6 and the engagement portion 25 on the external side of the stator. The axial length of the axle end assembly can be kept very minor in this way. Furthermore shown is a first embodiment according to which a clearance, or opening 23, respectively, through which the driveshaft 9, preferably also the first gear wheel 4A, can be push-fitted is provided on the second housing part 22 in the region of the engagement portion 25. The clearance 23 herein has a minimum diameter $D_{23}$ which is larger than the diameter of the part which is to be push-fitted through the clearance. In the present case, the minimum diameter $D_{23}$ of the clearance 23 is larger than the maximum external diameter $D_{4A}$ of the first gear wheel 4A. It is understood that the minimum internal diameter $D_{23}$ in an alternative embodiment, when only the driveshaft 9 has to be push-fitted through the clearance 23, has to be larger than the maximum external diameter $D_9$ of the driveshaft 9. In this embodiment, the housing interior space G, when the housing unit 2 is removed from the axle end assembly, is thus open toward the environment only in the region of the clearance 23.

Figure 2:
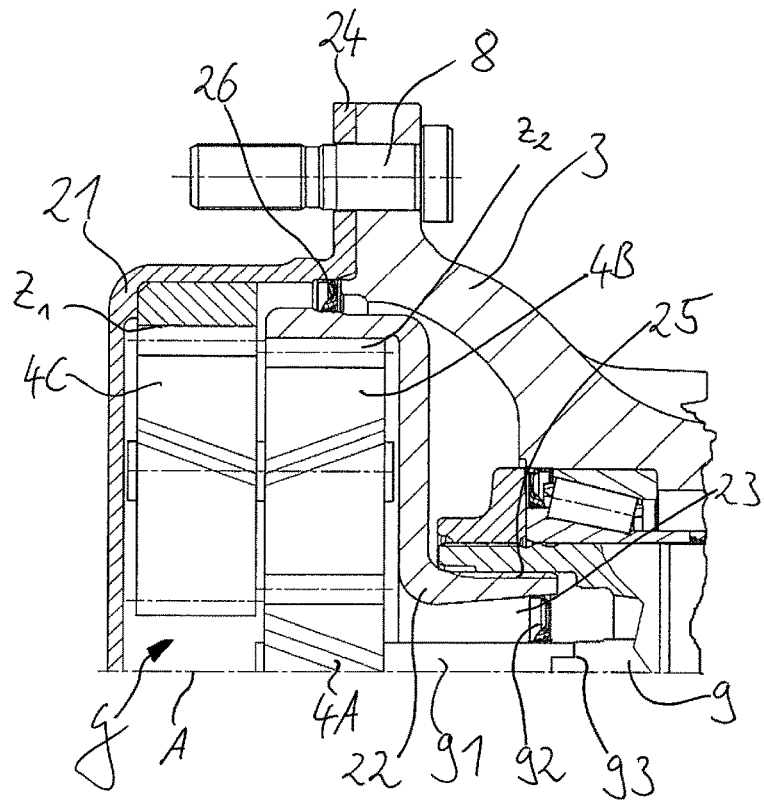
FIG. 2 shows a sectional view of a further preferred embodiment of the axle end assembly according to the invention.

FIG. 2 shows a further preferred embodiment of the axle end assembly according to the invention, wherein by contrast to the embodiment shown in FIG. 1 a shaft element 91 which by way of a shaft seal 92 is sealed in relation to the clearance 23 on the second housing part 22. The shaft element 91 thus protrudes from the housing interior space G, wherein the housing interior space G by contrast to the embodiment shown in FIG. 1 is completely encapsulated in relation to the environment. A transmission portion 93 which permits a transmission of torque between a driveshaft 9 and the shaft element 91 is provided on the shaft element 91. The drive axle 9 herein is preferably able to be plug-fitted to the shaft element 91 in a manner parallel to the axial A. The shaft seal 92 is preferably press-fitted into the clearance 23 on the second housing part. The other features of the embodiment of FIG. 2 correspond to the features of the embodiment in FIG. 1.

Figure 3:
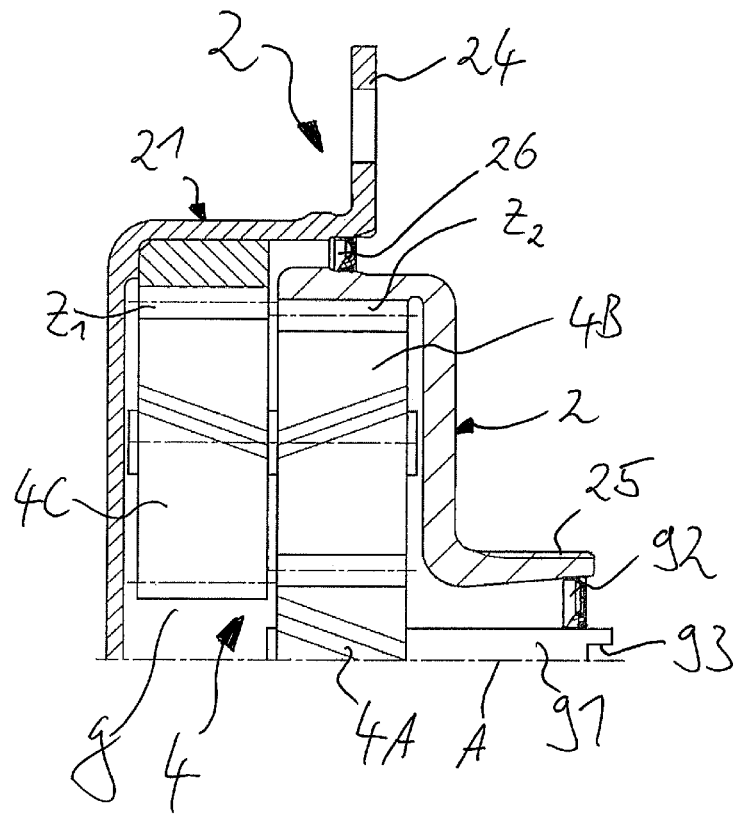
FIG. 3 shows a sectional view of a preferred embodiment of the housing unit according to the invention.

FIG. 3 shows the preferred embodiment already shown in FIG. 2 in a housing unit according to the invention, wherein it becomes particularly evident that the housing unit, and in particular the housing interior space G, are completely encapsulated, even when the housing 2 is removed from the wheel mounting. The housing interior space G herein is enclosed by the first housing part 21, the second housing part 22, the sealing element 26 provided between said two housing parts, the shaft seal 92, as well as the shaft element 91. In this way, the housing interior space G is embodied as a space which is completely and hermetically closed in relation to the environment.

Figure 4:
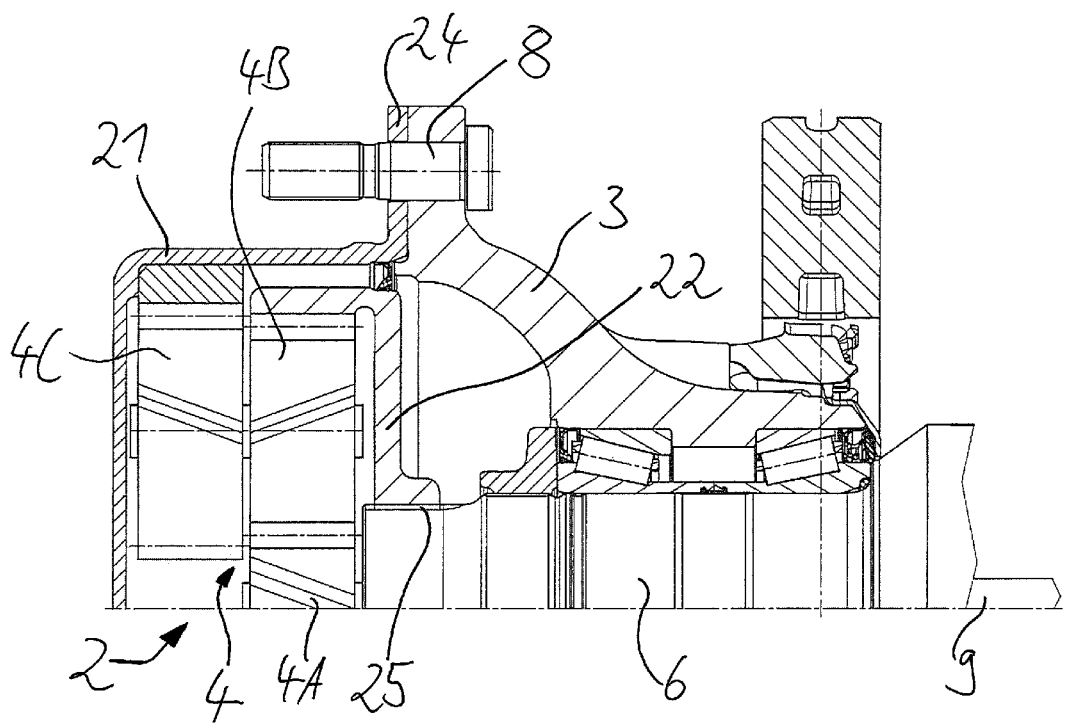
FIG. 4 shows a sectional view of a further preferred embodiment of the axle end assembly according to the invention.

FIG. 4 finally shows a sectional view of a further preferred embodiment, in which the engagement portion 25 of the second housing part 22 varies in comparison to the previously shown embodiments. In this embodiment, the engagement portion 25 is configured as a clearance on the second housing part 22 and has an internal toothing. By way of said internal toothing, the engagement portion 25 is able to be push-fitted onto a corresponding external toothing which is configured on the distal end of the stator 6. In comparison to the previously shown embodiments, this results a larger axial length of the axle end assembly, since additional space has to be created to the left of the wheel nut in which the engagement portion 25 and the stator 6 can engage in one another. The advantage of this embodiment lies in that said embodiment can be used with few modifications on many existing axle stumps and axle end assemblies. Moreover, on account of the pitch circle of the toothing that lies somewhat further toward the outside, this results in improved geometrical moments of inertia between the engagement portion 25 and the stator 6, and a larger lever arm for torques acting on said connection. The toothing between the engagement portion 25 and the stator 6 can thus be produced by way of smaller teeth and a smaller overlap, and thus with less complexity in terms of production. The other features of the embodiment shown in FIG. 4 correspond to those of the embodiment shown in FIG. 1.

LIST OF REFERENCE SIGNS

| | |
|---|---|
| 2 | Housing unit |
| 21 | First housing part |
| 22 | Second housing part |
| 23 | Clearance |
| 24 | Flange |
| 25 | Engagement portion |
| 26 | Sealing element |
| 3 | Hub |
| 4 | Gear wheel assembly |
| 4A | First gear wheel |
| 4B | Second gear wheel |
| 4C | Third gear wheel |
| 6 | Stator |
| 8 | Wheel bolt |
| 9 | Driveshaft |
| 91 | Shaft element |
| 92 | Shaft seal |
| 93 | Transmission portion |
| $D_{23}$ | Minimum internal diameter |
| $D_9$ | Maximum external diameter |
| $D_{4A}$ | Maximum external diameter |
| A | Axial |
| G | Housing interior space |
| $Z_1$ | First internal toothing |
| $Z_2$ | Second internal toothing |

The invention claimed is:

1. A housing unit for use in an axle end assembly of a commercial vehicle, comprising:
a first housing part; and
a second housing part, wherein the first housing part and the second housing part are disposed so as to be rotatable with respect to one another and cooperate with one another to define a housing interior space;
wherein the first housing part includes a flange configured to couple the first housing part to a wheel hub;
wherein the second housing part for safeguarding against rotation in relation to a stator of a wheel suspension has an engagement portion;
wherein a gear wheel assembly is disposed in the housing interior space so as to transmit a torque of a driveshaft to the first housing part;
wherein the first and second housing parts are hermetically sealed to one another when the housing unit is engaged with the wheel hub, at least 70% of an inward face of the housing unit is closed when the housing unit is disengaged from wheel hub, and wherein the inward face of the housing unit is open to receive the driveshaft when the housing unit is disengaged from the wheel hub;
wherein the first housing part in regions overlaps the second housing part, wherein a sealing element which seals the housing interior space is provided in the region of said overlap, wherein the sealing element secures the first and the second housing part in a mutual axial position thereof; and
wherein the sealing element is press-fitted into the first housing part.

2. The housing unit as claimed in claim 1, wherein the second housing is closed except for an opening from which the stator is disengaged subsequent to the housing unit being disengaged from the engagement portion.

3. The housing unit as claimed in claim 2, wherein a clearance through which the driveshaft is configured to be guided is provided in the region of the engagement portion on the second housing part.

4. The housing unit as claimed in claim 3, wherein the clearance has a minimum internal diameter which is 1.05 to 1.3 times a maximum external diameter of the driveshaft, or a maximum external diameter of a first gear wheel of the gear wheel assembly.

5. The housing unit as claimed in claim 1, wherein the housing interior space is completely closed subsequent to the housing unit being disengaged from the engagement portion of the stator, and wherein a shaft element protrudes from the housing interior space and is sealed in relation to the second housing part by a shaft seal.

6. The housing unit as claimed in claim 5, wherein a transmission portion by way of which the driveshaft for transmitting a torque can be brought to engage in a form-fitting manner is provided on the shaft element.

7. An axle end assembly for use in a commercial vehicle, comprising:
the housing unit as claimed in claim 5;
wherein the flange of the housing unit is on the wheel hub;
wherein the second housing part is established in a rotationally fixed manner on the stator by the engagement portion;
wherein the driveshaft is disposed within the stator and transmits a torque to the gear wheel assembly that is disposed within the housing unit, the torque driving the first housing part and the hub; and
wherein the housing interior space of the housing unit is substantially closed in relation to an environment external to the housing unit.

8. The axle end assembly as claimed in claim 7, wherein the engagement portion is configured as a cylindrical portion having an external toothing, wherein an internal toothing which runs substantially parallel to a longitudinal axis of the housing unit along which is provided a bearing seat for the rotatable mounting of the hub on the stator and/or an axle nut.

9. The axle end assembly as claimed in claim 7, wherein the flange of the first housing part is coupled to the hub by a multiplicity of wheel bolts.

10. The housing unit as claimed in claim 1, wherein coupling the flange to the wheel hub secures the housing unit in relation to being repositioned in an axial direction with respect to the housing unit.

11. The housing unit as claimed in claim 10, wherein the engagement portion is configured as a cylindrical portion having an external toothing, and wherein the engagement portion is configured to be push-fitted in the axial direction into the stator so as to come to engage in a rotationally fixed manner with an internal toothing on the stator.

12. The housing unit as claimed in claim 10, wherein the engagement portion is configured as a cylindrical portion having an internal toothing, and wherein the engagement portion is configured to be push-fitted in the axial direction onto the stator so as to come to engage in a rotationally fixed manner with an external toothing on the stator.

13. A housing unit for use in an axle end assembly of a commercial vehicle, comprising:
a first housing part; and
a second housing part, wherein the first housing part and the second housing part are disposed so as to be rotatable with respect to one another and cooperate with one another to define a housing interior space;
wherein the first housing part includes a flange configured to couple the first housing part to a wheel hub;
wherein the second housing part for safeguarding against rotation in relation to a stator of a wheel suspension has an engagement portion;

wherein a gear wheel assembly is disposed in the housing interior space so as to transmit a torque of a driveshaft to the first housing part;

wherein the first and second housing parts are hermetically sealed to one another when the housing unit is engaged with the wheel hub, at least 70% of an inward face of the housing unit is closed when the housing unit is disengaged from wheel hub, and wherein the inward face of the housing unit is open to receive the driveshaft when the housing unit is disengaged from the wheel hub; and wherein the gear wheel assembly comprises a first gear wheel which is drivable or driven indirectly or directly by the driveshaft, and wherein the gear wheel assembly comprises at least a second gear wheel which engages in a first internal toothing on the second housing part and transmits a torque to a third gear wheel which engages in a second internal toothing on the first housing part.

14. The housing unit as claimed in claim 13, wherein the second housing is closed except for an opening from which the stator is disengaged subsequent to the housing unit being disengaged from the engagement portion.

15. The housing unit as claimed in claim 14, wherein a clearance through which the driveshaft is configured to be guided is provided in the region of the engagement portion on the second housing part.

16. The housing unit as claimed in claim 15, wherein the clearance has a minimum internal diameter which is 1.05 to 1.3 times a maximum external diameter of the driveshaft, or a maximum external diameter of the first gear wheel of the gear wheel assembly.

17. The housing unit as claimed in claim 13, wherein the housing interior space is completely closed subsequent to the housing unit being disengaged from the engagement portion of the stator, and wherein a shaft element protrudes from the housing interior space and is sealed in relation to the second housing part by a shaft seal.

18. The housing unit as claimed in claim 17, wherein a transmission portion by way of which the driveshaft for transmitting a torque can be brought to engage in a form-fitting manner is provided on the shaft element.

19. The housing unit as claimed in claim 13, wherein coupling the flange to the wheel hub secures the housing unit in relation to being repositioned in an axial direction with respect to the housing unit.

* * * * *

UNITED STATES PATENT AND TRADEMARK OFFICE
CERTIFICATE OF CORRECTION

Page 1 of 2

PATENT NO.         : 11,602,953 B2
APPLICATION NO.    : 16/649323
DATED              : March 14, 2023
INVENTOR(S)        : Olaf Drewes It is certified that error appears in the above-identified patent and that said Letters Patent is hereby corrected as shown below:

On the Title Page

Item (57), Abstract, Line 12:
"are" should be – is –

In the Specification

Column 5, Line 24:
"function" should be – functions –

Column 7, Line 5:
"they" should be – the –

Column 7, Lines 6, 20, 28:
"plug-fitted" should be – push-fitted –

Column 7, Line 13:
"herein" should be – therein –

Column 8, Line 24:
"drive axle" should be – driveshaft –

Column 8, Line 52:
After "results" insert – in –

In the Claims

Column 9, Claim 1, Line 48:
After "from" insert -- the --

Signed and Sealed this
Twenty-fourth Day of December, 2024

Derrick Brent
*Acting Director of the United States Patent and Trademark Office*

CERTIFICATE OF CORRECTION (continued)
U.S. Pat. No. 11,602,953 B2

Column 10, Claim 12, Line 54:
"onto" should be – into –

Column 11, Claim 13, Line 8:
After "from" insert -- the --